US005603561A

United States Patent [19]

Ohishi

[11] Patent Number: 5,603,561

[45] Date of Patent: Feb. 18, 1997

[54] VEHICULAR LAMP HAVING APPEARANCE OF DEPTH

[75] Inventor: Kazutami Ohishi, Shizuoka, Japan

[73] Assignee: Koito Manufacturing Co., Ltd., Tokyo, Japan

[21] Appl. No.: 360,611

[22] Filed: Dec. 21, 1994

[30] Foreign Application Priority Data

Dec. 21, 1993 [JP] Japan .............................. 5-072915 U

[51] Int. Cl.$^6$ .............................. B60Q 1/26

[52] U.S. Cl. .............................. 362/80; 362/61; 362/309; 362/327; 362/331; 362/332; 362/339

[58] Field of Search .............................. 362/308, 309, 362/326–333, 348, 61, 80, 339

[56] References Cited

U.S. PATENT DOCUMENTS

| | | | |
|---|---|---|---|
| 1,174,470 | 3/1916 | Beutell | 362/330 |
| 2,003,804 | 6/1935 | Falge | 362/327 |
| 2,798,147 | 7/1957 | Orsatti | 362/332 |
| 3,267,278 | 8/1966 | Doolittle | 362/309 |
| 4,644,455 | 2/1987 | Inglis et al. | 362/331 |
| 4,654,761 | 3/1987 | Walsh | 362/308 |
| 5,373,423 | 12/1994 | Liedtke et al. | 362/331 |

FOREIGN PATENT DOCUMENTS

| | | | |
|---|---|---|---|
| 2385977 | 2/1978 | France | 362/331 |
| 179604 | 8/1991 | Japan | 362/309 |
| 2054815 | 2/1981 | United Kingdom | 362/348 |

*Primary Examiner*—Ira S. Lazarus
*Assistant Examiner*—Alan B. Cariaso
*Attorney, Agent, or Firm*—Sughrue, Mion, Zinn, Macpeak & Seas

[57] ABSTRACT

A vehicular lamp including a lamp body having a front opening, a reflector disposed at an inner-rear surface of the lamp body, a light source mounted at the central part of the lamp body for emitting a light beam, and an outer lens covering the front opening of the lamp body. The outer lens includes linearly extending steps such as concave or convex cylindrical lens and retroreflection steps. The linearly extending steps and the retroreflection steps are alternatingly arrayed.

25 Claims, 3 Drawing Sheets

VEHICULAR LAMP HAVING APPEARANCE OF DEPTH

BACKGROUND OF THE INVENTION

The present invention relates to a vehicular lamp, more particularly, the invention provides a vehicular lamp having a novel outer lens which makes the lamp have an appearance of depth.

In the outer lens of a conventional vehicular lamp fisheye steps are formed over the entire surface of the lens so as to conceal the interior of the lamp, or cylindrical steps are formed over the entire surface of the lens, so that the interior of the lamp is seen from the outside. The conventional lamp thus looks flat as a whole due to the presence of the fisheye steps or cylindrical steps.

SUMMARY OF THE INVENTION

The present invention was made in order to overcome such disadvantages accompanying the conventional lamp.

Accordingly, an object of the invention is to provide a vehicular lamp capable of presenting an appearance of depth and thus providing a good visual impression.

The above and other objects are achieved by the provision of a vehicular lamp which, according to the present invention, includes an outer lens for covering a front opening of a lamp body having a light source disposed therein, thereby defining a lamp space, the outer lens being provided with an area including linearly extending steps and another area including retroreflection steps. The linearly extending steps and retroreflection steps are alternatingly arrayed.

In the vehicular lamp thus constructed, when observing the lens from the front side, one can see the interior of the lamp space through the areas including the concave cylindrical steps. Through the area including the retroreflection steps, one can see just the glittering retroreflection steps due to their retroreflection. The difference of the distances to the objects seen from the front sides gives an appearance of depth to the lamp.

DESCRIPTION OF THE PREFERRED EMBODIMENTS

Preferred embodiments of a vehicular lamp according to the present invention will be described in detail with reference to the accompanying drawings.

Figure 1:
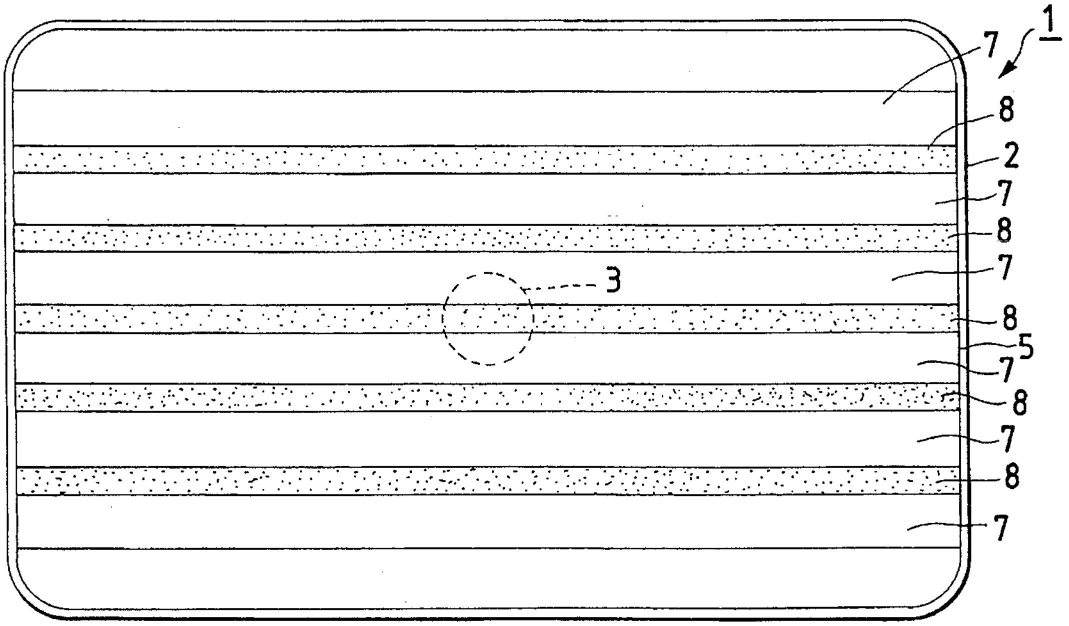
FIG. 1 is a front view showing, in cooperation with FIGS. 2 and 3, a first embodiment of a vehicular lamp constructed according to a preferred embodiment of the present invention.
Figure 2:
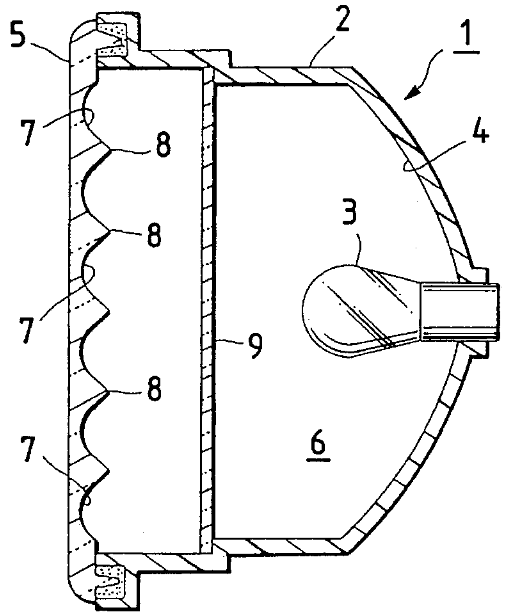
FIG. 2 is a longitudinal sectional view of the lamp of FIG. 1.
Figure 3:
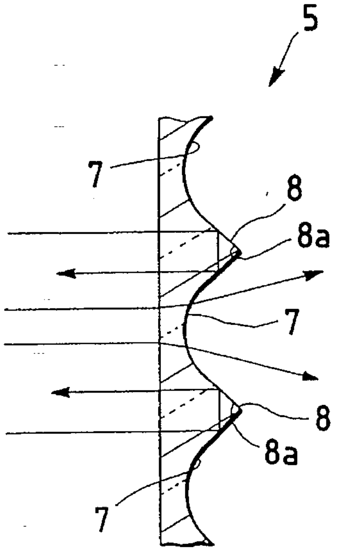
FIG. 3 is an enlarged, sectional view showing a key portion of the lamp, useful in explaining the operation of the marker lamp.

FIGS. 1 through 3 show a first embodiment of a lamp according to the present invention. In the first embodiment, the present invention is applied to a marker lamp for motor vehicles.

The marker lamp 1 includes a lamp body 2 and a bulb 3 disposed at the central part of the rear portion of the lamp body 2. The inner surface 4 of the rear part of the lamp body 2 is coated with a reflecting material to serve as a reflection surface.

An outer lens 5 is attached to the lamp body 2 such that a front opening of the lamp body 2 is covered with the lens 5. The outer lens 5 is made of transparent synthetic resin. A lamp space 6 is defined by the lamp body 2 and the outer lens 5. Concave cylindrical steps 7, each inwardly curved and horizontally extending, are formed on the rear surface of the outer lens 5. Retroreflection steps 8, called angle cuts, are also formed on the rear surface of the lens 5. The retroreflection steps 8 also extend horizontally. The cylindrical steps 7 and the retroreflection steps 8 are alternatingly arrayed on the rear surface of the outer lens 5. Each of the concave cylindrical steps 7 is semicircular in cross section and takes the form of a groove. The called angle cut is a long narrow lens step shaped like a triangle in cross section. The vertex angle **8*a*** of the triangle is approximately 90°.

An inner lens 9 is disposed between the outer lens 5 and the bulb 3. The inner lens 9 is amber colored but transparent.

In the marker lamp 1 thus constructed, when viewing the lamp from the front side, one can see the interior of the lamp space 6, namely, the amber-colored inner lens 9, through the concave cylindrical steps 7. Through the retroreflection steps 8, one can see just the glittering retroreflection steps 8 due to their retroreflection (FIG. 3). The difference of the distances to the objects seen from the front side causes the marker lamp to have an appearance of depth.

In some type of the horizontally elongated, concave cylindrical steps 7, rays of light passing through the steps tend to be vertically diffused. Horizontal diffusion is also required for the marker lamp for motor vehicles. The horizontal diffusion may be achieved by forming vertically extending, long narrow strips semicylindrical in cross section on the reflection surface 4. In a case where the reflection surface 4 does not have such a horizontal diffusion function, vertically elongated, long narrow lens steps are formed on the inner lens 9 so that rays of light passing through these lens steps are horizontally diffused. Further, in a case where the concave cylindrical steps formed on the lens are vertically extended, it is preferable that the reflection surface be designed so as to reflect rays of light while vertically diffusing the same, or the inner lens is designed so as to vertically diffuse rays of light passing therethrough.

Figure 4:
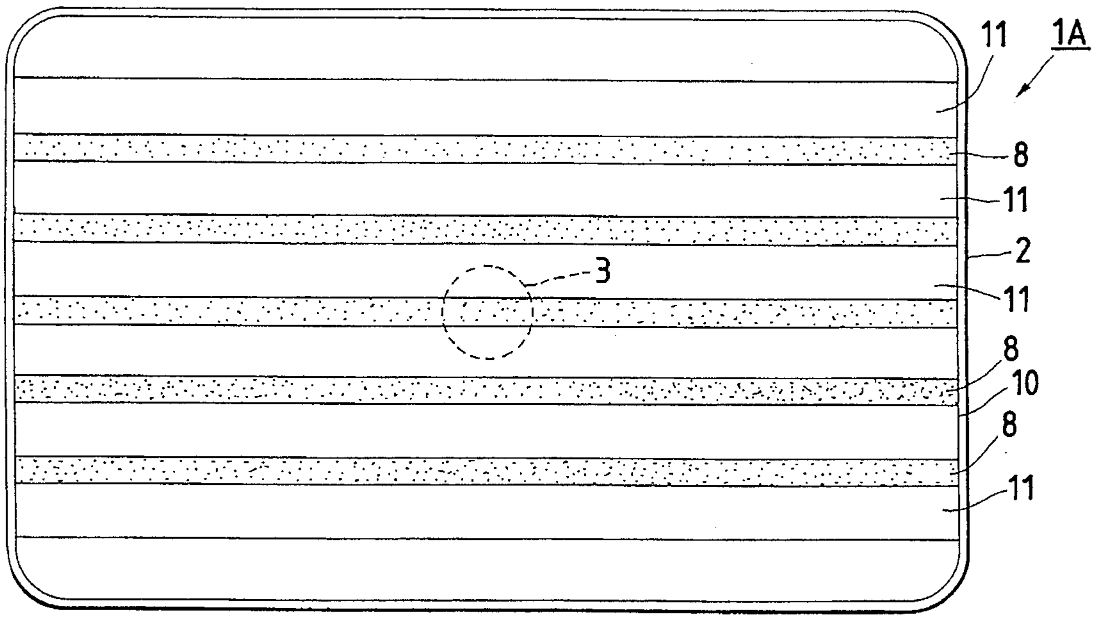
FIG. 4 is a front view showing, in cooperation with FIGS. 5 and 6, a second embodiment of a vehicular lamp according to the present invention.
Figure 5:
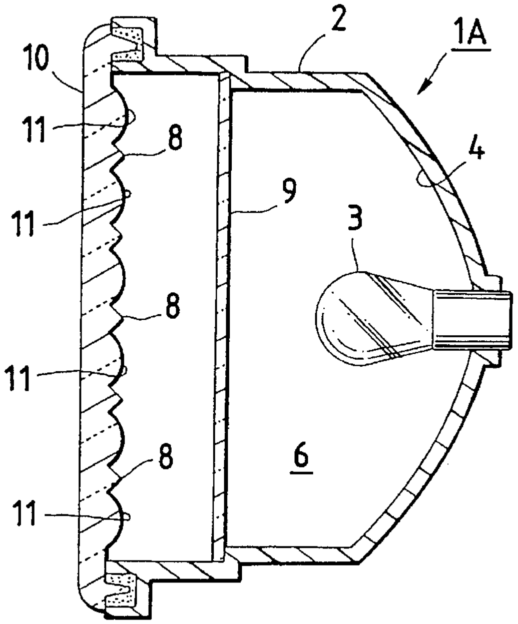
FIG. 5 is a longitudinal sectional view showing the marker lamp shown in FIG. 4.
Figure 6:
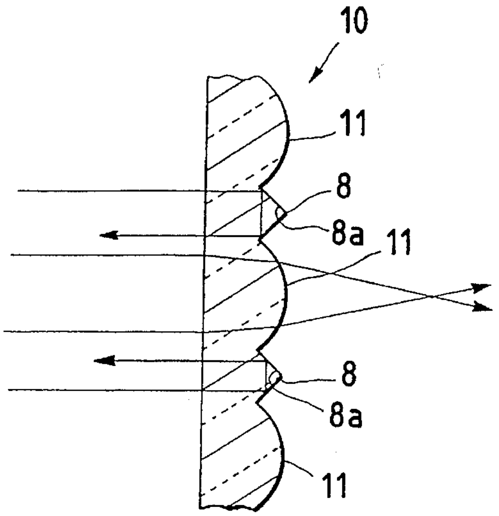
FIG. 6 is an enlarged, sectional view showing a key portion of the marker lamp, useful in explaining the operation of the marker lamp.

FIGS. 4 through 6 show a second embodiment of a vehicular lamp according to the present invention. Also in the second embodiment, the present invention is applied to a marker lamp 1A for motor vehicles.

The second embodiment differs from the first embodiment only in that the linearly extending steps formed on the outer lens are different from those in the first embodiment. The remaining portions of the second embodiment are the same as the first embodiment. Therefore, the subsequent description will emphasize just the different portions. Like or equivalent portions are designated by like reference numerals in the figures of drawings of the first embodiment for simplicity.

An outer lens 10 is attached to the lamp body 2 such that it covers the front opening of the lamp body. Convex cylindrical steps 11, each outwardly curved and horizontally extending, are formed on the inner surface of the lens 10. Retroreflection steps 8, called angle cuts, are also formed on the inner surface of the lens. The retroreflection steps 8 extend horizontally. The cylindrical steps 11 and the retroreflection steps 8 are alternatingly arrayed on the inner surface of the lens 5. Each of the cylindrical steps 11 is a lens step upwardly curved or semicircular in cross section.

In the marker lamp 1A thus constructed, when viewing the lens from the front side, one can see the interior of the lamp space 6, namely, the amber-colored inner lens 9, through the convex cylindrical steps 11. Through the retroreflection steps 8, one can see just the glittering retroreflection steps 8 due to their their retroreflection (FIG. 6). The difference of the distances to the objects seen from the front side affords the marker lamp an impression of depth.

Also in the second embodiment, it is desirable that the reflector 4 and the inner lens 9 have the function to horizontally diffusing rays of light incident on and passing therethrough, as in the first embodiment.

In the first and second embodiments, one concave cylindrical step 7 (convex cylindrical step 11) is formed in one corresponding area of the lens 5 (10), and one retroreflection step 8 is formed in one corresponding area of the same. If required, a plural number of cylindrical steps 7 (cylindrical steps 11) may be formed in one corresponding area of the lens 5 (10), and a plural number of retroreflection steps 8 may be formed in one corresponding area of the same.

In the above-described embodiments, the concave cylindrical steps 7, the convex cylindrical steps 11, and the retroreflection steps 8 extend horizontally. However, those elements may extend vertically, as a matter of course.

Figure 7A:
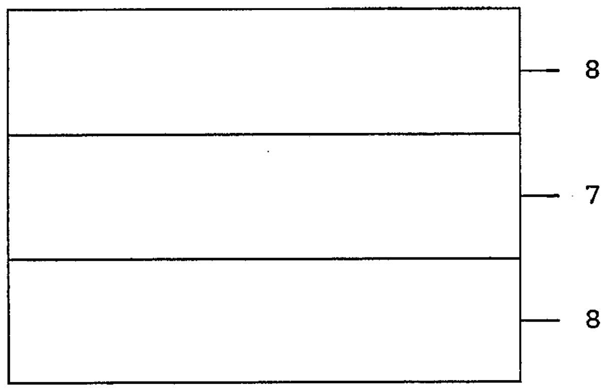
FIGS. 7A–7C are alternative embodiments of the present invention.
Figure 7B:
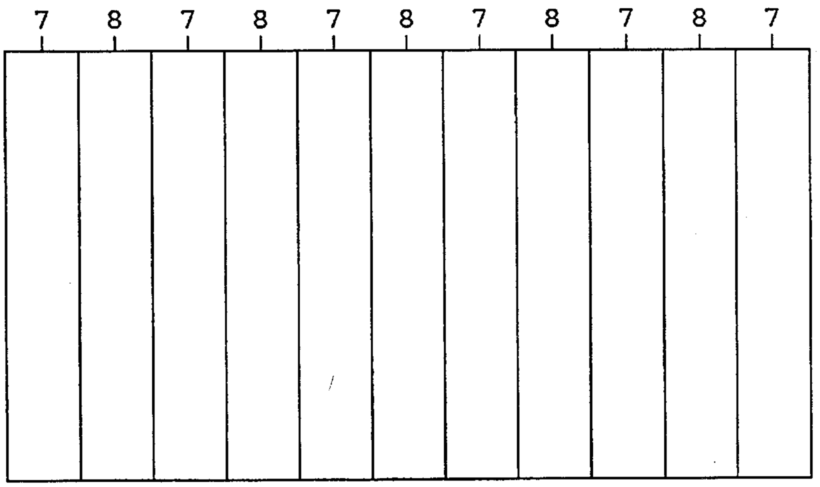
Figure 7C:
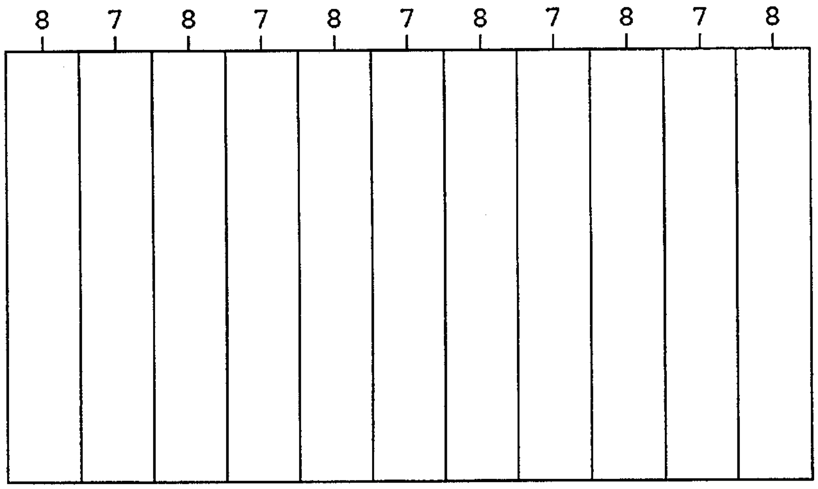

As specific examples, the outer lens may be vertically segmented into eleven sectional areas, top and bottom areas of which are formed of said linearly extending steps. The outer lens may also be vertically segmented into three sectional areas, top and bottom areas of which are formed of retroreflection steps, as seen in FIG. 7A. The outer lens may be horizontally segmented, each segment being alternately formed of linearly extending steps and retroreflection steps. The outer lens may further be horizontally segmented into eleven sectional areas, leftmost and rightmost areas of which are formed of the linearly extending steps, as seen in FIG. 7B. Still further, the outer lens may be horizontally segmented into eleven sectional areas, rightmost and leftmost areas of which are formed of the retroreflection steps, as seen in FIG. 7C.

Provision of the inner lens 9 is not essential in the marker lamp of the present invention. If it is used, a suitable color other than amber color may used for the inner lens 9. For example, red color may be used when the present invention is applied to a tail lamp.

As seen from the foregoing description, the marker lamp for vehicles of the present invention is characterized in that the front of a lamp space with a light source disposed therein is covered with an outer lens, and the outer lens includes an area including a linearly extending step and another area including a retroreflection step are alternately arrayed.

In the marker lamp thus constructed, when observing the lens from the front side, one can see the interior of the lamp space through the areas including the concave cylindrical steps. Through the area including the retroreflection steps, one can see just the glittering retroreflection steps due to their retroreflection. The difference of the distances to the objects seen from the front side causes the marker lamp to have an appearance of depth.

It should be understood that the form of the invention herein shown and described is to be taken as a preferred example of the invention, and that various changes in the shape, size and arrangement of parts may be resorted to without departing from the spirit of the invention or the scope of the subjoined claims. For example, the outer lens of the invention is also applicable to a turn signal lamp, a stop lamp or a tail lamp of the automobile, as the invention is not limited to a marker lamp.

What is claimed is:

1. A vehicular lamp comprising:

a lamp body having a front opening;

a reflector disposed at an inner-rear surface of said lamp body;

a light source mounted at a central part of said lamp body for emitting a light beam; and an outer lens covering said front opening said lamp body, said outer lens comprising at least one of a convex and a concave structure defining linearly extending steps and retroreflection steps, said linearly extending steps and said retroreflection steps being alternatingly arrayed, and said linearly extending steps and said retroreflection steps permitting a reflection of light at different distances, thereby providing an appearance of depth.

2. The lamp according to claim 1, wherein said outer lens is vertically segmented into a plurality of sectional areas, and said sectional areas are alternatingly formed of said linearly extending steps and said retroreflection steps.

3. The lamp according to claim 2, wherein said outer lens is vertically segmented into eleven sectional areas, top and bottom areas of which are formed of said linearly extending steps.

4. The lamp according to claim 2, wherein said outer lens is vertically segmented into three sectional areas, and a top and bottom areas are formed of said retroreflection steps.

5. The lamp according to claim 1, wherein said outer lens is horizontally segmented, and each segment being alternately formed of said linearly extending steps and said retroreflection steps.

6. The lamp according to claim 5, wherein said outer lens is horizontally segmented into eleven sectional areas, leftmost and rightmost areas of which are formed of said linearly extending steps.

7. The lamp according to claim 5, wherein said outer lens is horizontally segmented into eleven sectional areas, rightmost and leftmost areas of which are formed of said retroreflection steps.

8. A vehicular lamp comprising:

a lamp body having a front opening;

a reflector disposed at an inner-rear surface of said lamp body;

a light source mounted at a central part of said lamp body for emitting a light beam; and an outer lens covering said front opening said lamp body, said outer lens comprising linearly extending steps and retroreflection steps, said linearly extending steps and said retroreflection steps being alternatingly arrayed, and said linearly extending steps and said retroreflection steps permitting a reflection of light at different distances, thereby providing an appearance of depth wherein said linearly extending steps comprise concave cylindrical steps.

9. The lamp according to claim 8, wherein each of said concave cylindrical steps are semicircular in cross section and have the form of a groove.

10. A vehicular lamp comprising:

a lamp body having a front opening;

a reflector disposed at an inner-rear surface of said lamp body;

a light source mounted at a central part of said lamp body for emitting a light beam; and an outer lens covering said front opening said lamp body, said outer lens comprising linearly extending steps and retroreflection steps, said linearly extending steps and said retroreflection steps being alternatingly arrayed, and said linearly extending steps and said retroreflection steps permitting a reflection of light at different distances, thereby providing an appearance of depth wherein said linearly extending steps comprise convex cylindrical steps.

11. The lamp according to claim 10, wherein said convex cylindrical steps are lens step upwardly curved.

12. The lamp according to claim 10, wherein said convex cylindrical steps are semicircular in cross section.

13. The lamp according to claim 1, wherein each of said retroreflection steps comprises a long narrow lens step shaped like a triangle in cross section, a vertex angle of said triangle being approximately 90°.

14. The lamp according to claim 1, wherein said outer lens is formed of a transparent synthetic resin.

15. The lamp according to claim 1, wherein said reflector has formed thereon vertically extending, long narrow strips semicylindrical in cross section.

16. The lamp according to claim 1, further comprising an inner lens disposed in said lamp body between said outer lens and said reflector.

17. The lamp according to claim 16, wherein said inner lens has formed thereon vertically elongated, long narrow lens steps.

18. The lamp according to claim 1, wherein said lamp is a marker lamp.

19. The lamp according to claim 1, wherein said lamp is a turn signal lamp.

20. The lamp according to claim 1, wherein said lamp is a stop lamp.

21. The lamp according to claim 1, wherein said lamp is a tail lamp.

22. The lamp according to claim 16, wherein said inner lens is amber colored.

23. The lamp according to claim 17, wherein said inner lens is amber colored.

24. The lamp according to claim 16, wherein said inner lens is red colored.

25. The lamp according to claim 17, wherein said inner lens is red colored.

* * * * *